(12) United States Patent
Hardy et al.

(10) Patent No.: US 6,915,330 B2
(45) Date of Patent: Jul. 5, 2005

(54) WEB FUNCTION BLOCKS CAPABLE OF EXCHANGING HTTP TYPE OF MESSAGES IN AUTOMATION EQUIPMENT

(75) Inventors: Christian Hardy, Le Thoronet (FR); Christophe Vincent, La Roquette-sur-Siagne (FR); Jean-Marie Stawikowski, Antibes (FR); Robert Rousseau, Antibes (FR)

(73) Assignee: Schneider Automation (FR)

( * ) Notice: Subject to any disclaimer, the term of this patent is extended or adjusted under 35 U.S.C. 154(b) by 741 days.

(21) Appl. No.: 09/893,662

(22) Filed: Jun. 29, 2001

(65) Prior Publication Data

US 2002/0016815 A1 Feb. 7, 2002

(30) Foreign Application Priority Data

Jun. 30, 2000 (FR) ............................................. 00 08567

(51) Int. Cl.⁷ .............................................. G06F 15/16
(52) U.S. Cl. .......................... 709/203; 709/217; 700/83; 710/1
(58) Field of Search ........................ 709/203, 217–219; 700/83; 717/106–109; 710/1

(56) References Cited

U.S. PATENT DOCUMENTS

| | | | | |
|---|---|---|---|---|
| 6,061,603 A | * | 5/2000 | Papadopoulos et al. | ....... 700/83 |
| 6,170,007 B1 | * | 1/2001 | Venkatraman et al. | ...... 709/218 |
| 6,282,454 B1 | * | 8/2001 | Papadopoulos et al. | ........ 700/83 |
| 6,370,569 B1 | * | 4/2002 | Austin | ......................... 709/217 |
| 2001/0014833 A1 | * | 8/2001 | Brault | .......................... 700/18 |

FOREIGN PATENT DOCUMENTS

| | | |
|---|---|---|
| WO | 99/13418 | 3/1999 |
| WO | 99/63409 | 12/1999 |

OTHER PUBLICATIONS

IEC 1131–3: A Standard Programming Resource for PLCs; Control Engineering, Feb. 1996, pp. 67–68, 75.

Simple Object Access Protocol (SOAP) 1.1, May 8, 2000.

* cited by examiner

*Primary Examiner*—Wen-Tai Lin
(74) *Attorney, Agent, or Firm*—Parkhurst & Wendel, L.L.P

(57) ABSTRACT

A communication system for automation equipment on a TCP/IP network. The automation equipment controls an automation application by executing an application program written according to standard IEC1131-3. The communication system includes at least a reception WEB function block integrated into the application program to implement a WEB server function, and/or at least one send WEB function block integrated into the application program to implement a WEB client function, and an HTTP interface capable of routing messages between the TCP/IP network and WEB function blocks identified by a URL address. The contents of HTTP requests may be an XML frame or a UEL encoded frame.

13 Claims, 3 Drawing Sheets

WEB FUNCTION BLOCKS CAPABLE OF EXCHANGING HTTP TYPE OF MESSAGES IN AUTOMATION EQUIPMENT

FIELD OF THE INVENTION

This invention relates to a communication system for automation equipment on a global network of the Internet, Intranet or Extranet type, used to implement a WEB server function and a WEB client function inside an automation application, by means of at least one WEB function block that can interact with the automation application program. This invention also relates to automation equipment integrating this type of communication system and a programming station capable of defining parameters for WEB function blocks. This communication system can be applied to any application belonging to the domains of industrial automation, building automation or instrumentation/control of electricity distribution networks.

In the following, the term "automation equipment" denotes a programmable logic controller, an instrumentation/control station, a digital control or any equipment that can contain and run a user program controlling an automation application. This user program, also called an application program, is designed to provide instrumentation and control for automation application particularly by means of inputs/outputs controlled by this application program. It is produced by a designer and is written in one or several graphic automation languages, and particularly the contact diagram type language (Ladder language), Sequential Function Chart or Grafcet language, Function Block Description, or in text automation languages such as IL (Instruction List) or ST (Structured Text). These automation languages are advantageously conform with standard IEC1131-3 to facilitate programming by an automation designer not necessarily familiar with computer languages. They can be used on programming stations such as computer equipment, and particularly PC type personal computers that can be connected to the automation equipment to be programmed.

BACKGROUND OF THE INVENTION

It is well known that automation equipment of this type can be integrated into a WEB server to be able to exchange data for this automation equipment with a remote WEB client such as a browser connected to a global Internet, Intranet or Extranet type network conform with the TCP/IP standard, hereinafter called the TCP/IP network. These functions are described particularly in documents WO9913418, U.S. Pat. No. 6,061,603 and U.S. Pat. No. 5,805,442. Data related to the automation equipment are then formatted and sent through the WEB server, for example in the form of HTML or XML pages. It is also possible that a WEB server located in automation equipment loads a program, normally called an Applet, into a WEB client, the said program being executed in the WEB client to exchange requests transported by the TCP/IP protocol with the WEB server of the automation equipment.

However, these solutions are particularly suitable for use of a browser (and do not enable the designer of an automation application to control data exchanges on the TCP/IP network). The designer is unable to create a client-server communication on the TCP/IP network directly from the application program.

However, this would be an extremely useful function in some cases, to be able to communicate on a TCP/IP network in order to receive commands or requests from a remote WEB client and to answer to these requests, while controlling the data exchanged on the TCP/IP network. Furthermore, it would be useful for an application program to be able to behave like an active WEB client and to be capable of sending requests and receiving data from a remote WEB server. It would then be possible to set up a communication on the TCP/IP network between the application program of an automation equipment and a WEB server/remote WEB client such as an ERP, for example to exchange production orders and reports.

SUMMARY OF THE INVENTION

For this purpose, the invention describes a communication system for automation equipment on a TCP/IP network that comprises exchange means for implementing a WEB server function or a WEB client function within an application program of an automation application loaded in the automation equipment, these exchange means comprising at least one WEB function block that can interact with the application program, that can be written in one or several languages conform with standard IEC1131-3. The communication system comprises at least one reception WEB function block to implement a WEB server function and/or at least one send WEB function block to implement a WEB client function in an application program.

The communication system also includes a front end HTTP interface in the automation equipment capable of firstly routing messages from the TCP/IP network to a reception WEB function block identified by a URL address, and secondly routing messages from a send WEB function block to a URL address on the TCP/IP network.

The invention also describes automation equipment integrating this type of communication system and a programming station enabling a designer of an automation application to display, insert, delete, modify or configure at least one WEB function block integrated into an application program, in order to control the communication system described.

Thus, with this invention, it is also possible to set up a direct communication using WEB capabilities, between application programs of several remote items of automation equipment, for example to synchronize production. If this communication is set up in automation equipment application programs using languages that are regularly used by application program designers, namely languages conform with standard IEC1131-3, then this would advantageously make it possible for them to very easily design automation applications distributed on the WEB.

Similarly, it will then be possible to insert existing automation equipment into a WEB architecture by slightly modifying their application programs.

BRIEF DESCRIPTION OF THE DRAWINGS

Other characteristics and advantages will become clear in the detailed description given below with reference to an embodiment given as an example and represented in the attached drawings in which.

DESCRIPTION OF THE PREFERRED EMBODIMENTS

Figure 1:
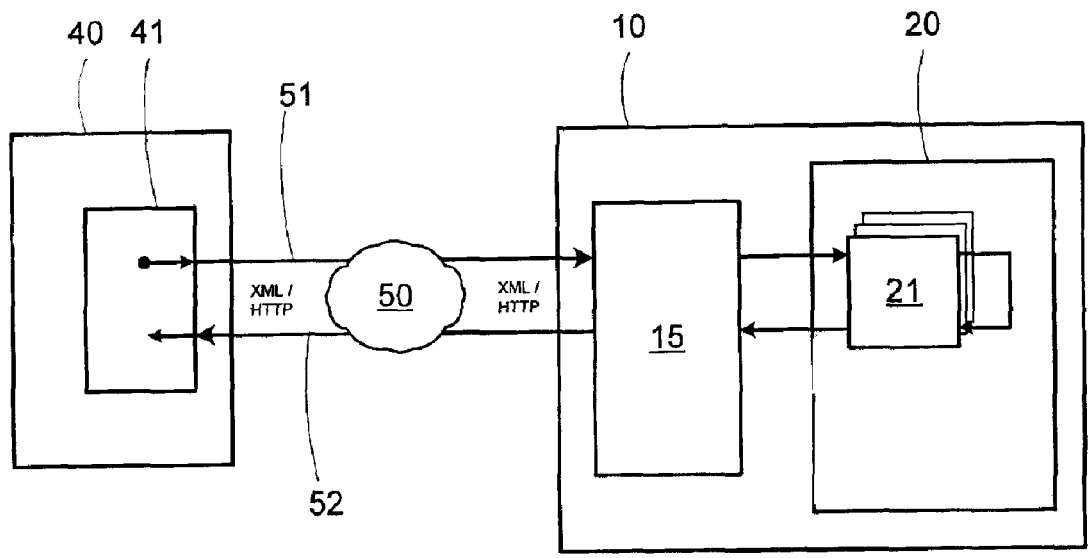
FIG. 1 shows a first example of communication between an automation equipment according to a communication system conform with the invention and client equipment.

FIG. 1 shows automation equipment 10 communicating with equipment 40 on a TCP/IP network 50. The automation equipment 10 comprises an HTTP front-end interface 15 and an application program 20. The equipment 40 comprises a client module 41 that may be a WEB browser capable of sending requests 51 conform with the HTTP protocol on the TCP/IP network 50, and containing a destination URL address and receiving answers 52 conform with the HTTP protocol. The contents of an HTTP request 51 or an HTTP answer 52 may be coded in different forms, for example such as an XML frame, a URL encoded frame, an HTML, WML, SOAP frame, or other ASCII or binary formats.

Figure 2:
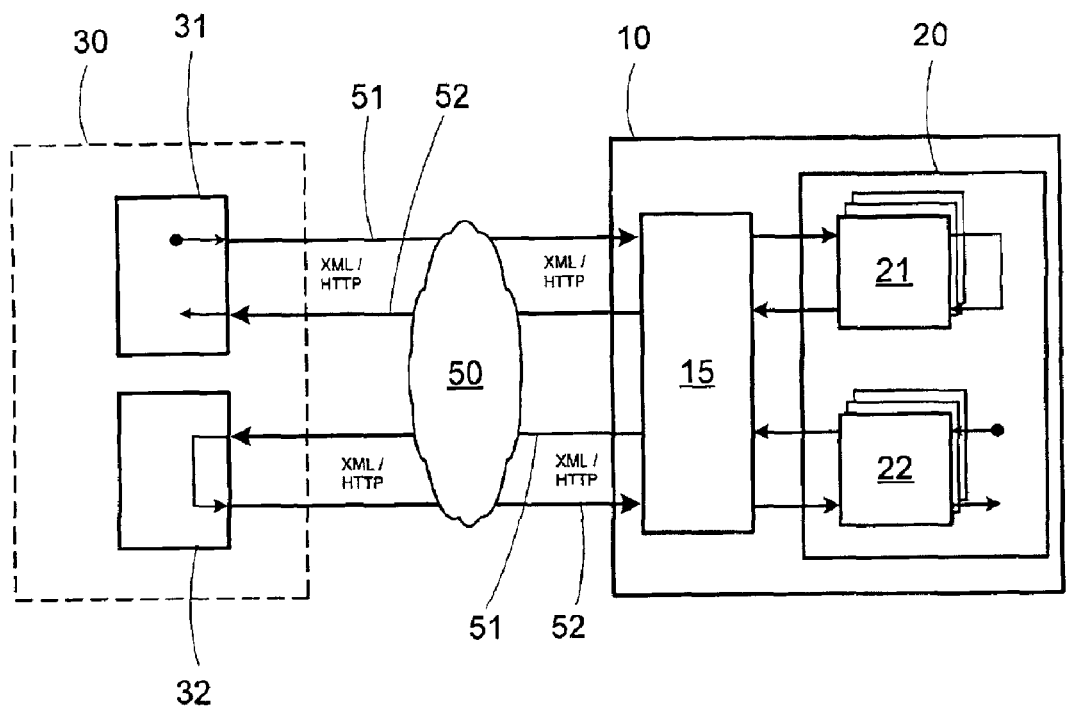
FIG. 2 shows a second example of communication in which automation equipment communicates with equipment acting as client and server.

FIG. 2 shows automation equipment 10 communicating firstly with a WEB client module 31 capable of sending HTTP requests 51 on the TCP/IP network 50 and receiving HTTP answers 52, and secondly with a WEB server module 32 capable of receiving HTTP requests 51 from the TCP/IP network 50 and sending HTTP answers 52. The WEB client module 31 and the WEB server module 32 may possibly belong to the same equipment 30 connected to the TCP/IP network 50, and for example comprising an ERP (Enterprise Resource Planning) application.

Figure 3:
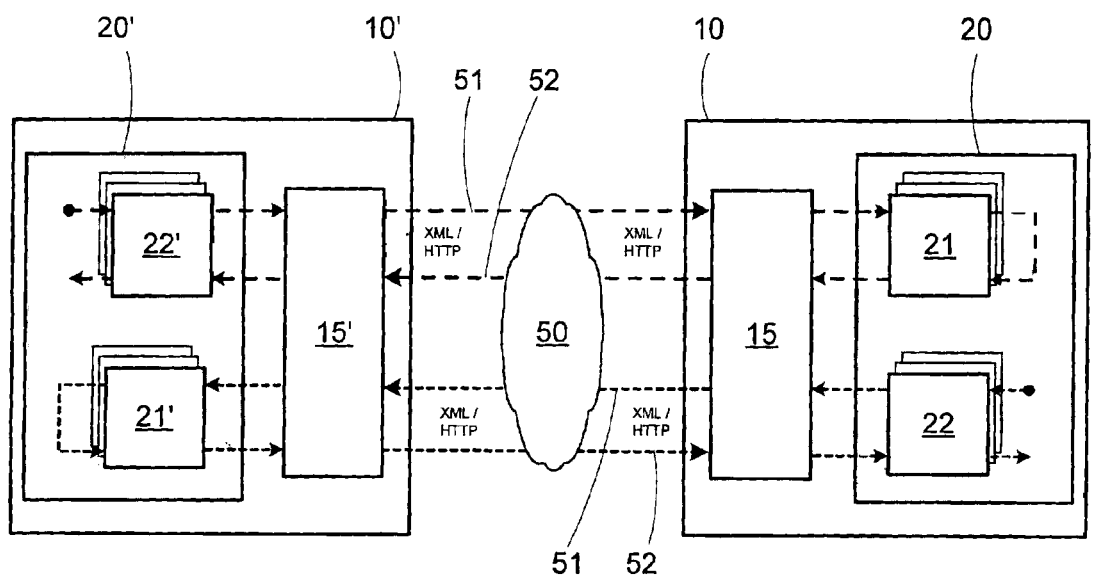
FIG. 3 shows a third example of communication between two items of automation equipment.

FIG. 3 shows two items of automation equipment 10,10' that communicate with each other on a TCP/IP network 50. Each automation equipment 10,10' comprises a front end HTTP interface 15,15' and an application program 20,20'.

An application program 20,20' is designed for the instrumentation/control of an automation application by means of inputs/outputs controlled by this application program. It is produced by a designer and is described in one or several languages, particularly including Ladder diagrams (LD), Sequence Function Charts (SFC), Instruction Lists (IL), Structured Programming (ST) or Function Blocks (BF). These languages are preferably conform with standard IEC1131-3, to facilitate programming by an automation designer, not necessarily familiar with computer languages.

One of the purposes of the invention is to include exchange means in an application program (20 or 20'), that the application program designer can use to open communication on the TCP/IP network 50. To achieve this, the communication system described in the invention comprises at least one WEB function block 21,22 (or 21', 22') that can be configured and that can interact with the application program 20 (or 20') in automation equipment 10 (or 10'). According to a preferred embodiment, it is possible to consider two distinct types of WEB function blocks; a first type is called a reception WEB function block 21 (or 21') and is used to implement a WEB server function in the application program 20 (20'), and a second type is called a send WEB function block 22 (or 22') and is used to implement a WEB client function in the application program 20 (or 20').

Thus, with the reception WEB function block 21, the application program 20 for automation equipment 10 is waiting for an HTTP request 51 output from a WEB client such as a WEB client module 41, 41' or a send WEB function block 22' of an application program 20' of an automation equipment 10', and sends an HTTP answer 52 to this request 51. Due to a send WEB function block 22, the application program 20 of automation equipment 10 may take the initiative of sending a request 51 to a WEB server module 32 or to a reception WEB function block 21' of an application program 20', and waits for an HTTP answer 52 to this request 51.

According to the invention, the WEB function blocks are integrated into the application program 20 that can be written in one or several languages conform with standard IEC1131-3. The WEB function blocks are inspired from communication function blocks defined in standard IEC131-5, but this type of WEB function block is not described in the standard. Thus, in FIGS. 4 and 5, a reception WEB function block 21 and a send WEB function block 22 are graphically symbolized with a contact diagram type language (Ladder language). They include a service name or identification 214, 224 and are provided with input parameters 212, 222 and output parameters 213, 223 that are logically connected to elements of the application program 20, such as the variables 215, 216, 225, 226. The input parameters 212, 222 correspond to orders or commands given by the application program 20 to the WEB function block 21, 22, and the output parameters 213, 223 correspond to reports or to results given by the WEB function block 21, 22 to the application program 20.

Figure 4:
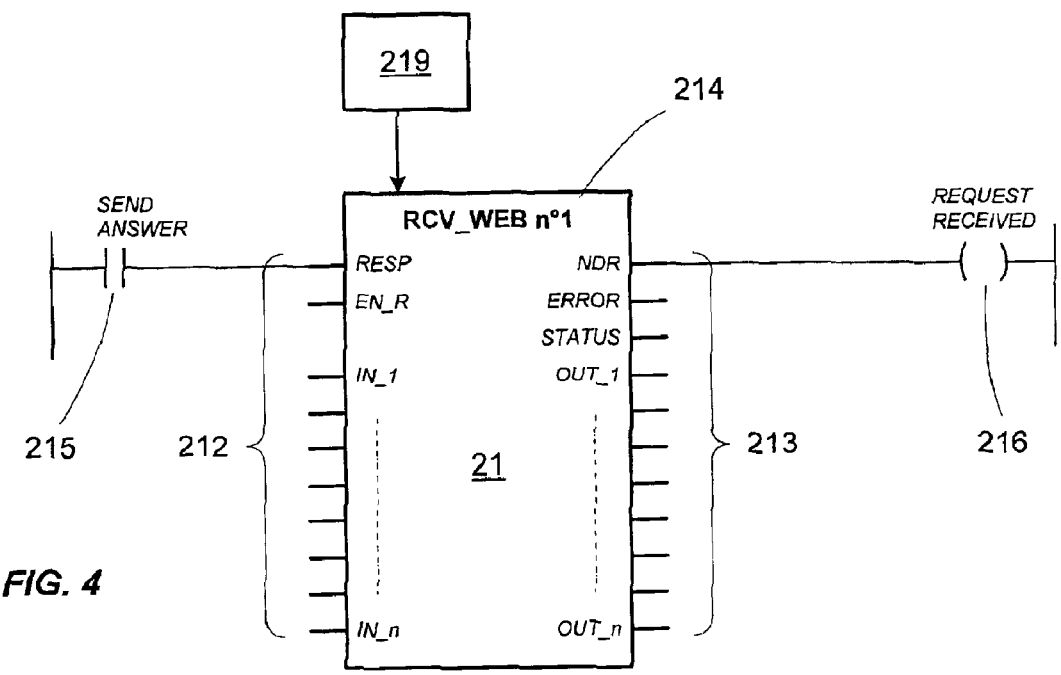
FIGS. 4 and 5 show details of a reception WEB function block and a send WEB function block respectively, in a LADDER type diagram.

With reference to an example embodiment presented in FIG. 4, the input parameters 212 of a reception WEB function block 21 comprise:

a RESP ("Respond") Boolean type input that causes a response 52 to a request 51 to be sent when it changes to the TRUE state. In the example shown in FIG. 4, this input is connected to a contact of a variable in the application program 20 called SEND ANSWER 215, such that the state of the RESP input of the WEB function block 21 is equal to the state of this SEND ANSWER variable, a Boolean type input EN_R ("Enable Receive"), that when in the TRUE state, validates acceptance of reception of a request by the WEB function block 21, one or several inputs IN_1 to IN_n containing the different parameters that will be sent in the answer 52 to the WEB client sending the request 51.

Similarly, the output parameters 213 for a reception WEB function block 21 comprise:

an NDR ("New Data received") Boolean type output that, when it changes to the TRUE state, notifies the application program 20 that a request 51 has just been received by the WEB function block 21. In the example shown in FIG. 4, this output is connected to the coil of an application program variable 20 called REQUEST RECEIVED 216, such that the state of this REQUEST RECEIVED variable is equal to the state of the output NDR of the WEB function block 21, a Boolean type output, ERROR, indicating that the WEB function block 21 is in error, an integer type output, STATUS, containing the value of the last valid state of the WEB function block 21, one or several outputs OUT_1 to OUT_n that will contain the parameters contained in the request 51.

Figure 5:
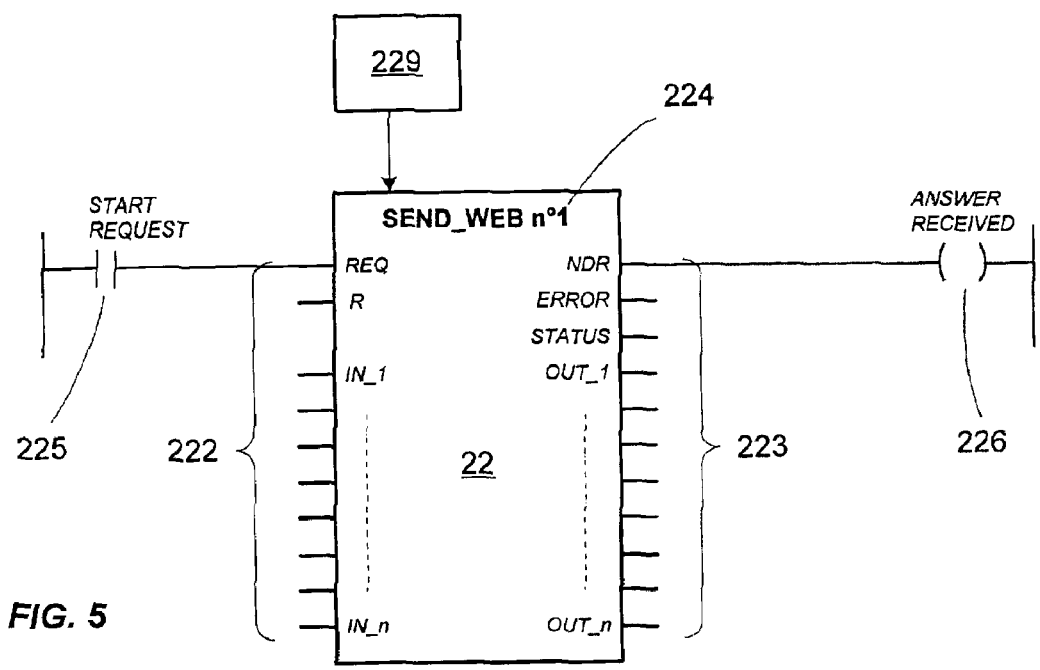

With reference to an example embodiment shown in FIG. 5, the input parameters 222 for a send WEB function block 22 comprise:

a REQ Boolean type input that, when it changes to the TRUE state, causes a request 51 to be sent. In the example shown in FIG. 5, this input is connected to a contact of a variable in the application program 20 called START REQUEST 225, such that the state of the input REQ in the WEB function block 22 is equal to the state of this START REQUEST variable, a Boolean type input R that reinitialises the WEB function block 22, one or several inputs IN_1 to IN_n containing parameters that will be sent in the request 51 to the destination WEB server.

Similarly, the output parameters 223 for a send WEB function block 22 comprise:

an NDR Boolean type output that, when it changes to the TRUE state, notifies the application program 20 that an answer 52 to the request 51 has just been received by the WEB function block 22. In the example shown in FIG. 5, this output is connected to the coil of a variable of the application program 20 called ANSWER RECEIVED 226, such that the state of this ANSWER RECEIVED variable is equal to the state of the NDR output from the WEB function block 22, a Boolean type output, ERROR, indicating that the WEB function block 22 is in error, an integer type output, STATUS, containing the value of the last valid state of the WEB function block 22, one or several outputs OUT_1 to OUT_n that will contain parameters sent by the WEB server in the answer 52.

A WEB function block 21, 22 comprises a generic program code that is common to all types of WEB function blocks, in this case the reception type WEB function block 21 and the send type WEB function block 22. A WEB function block 21,22 also comprises specific configuration data 219, 229 which may for example be stored in a configuration file specific to each WEB function block. These configuration data 219,229 comprise particularly:

the service name or identification that, in the case of a reception WEB function block 21 is the relative URL address in the automation equipment 10 and which enables any WEB client to identify it and send a request to it, the destination URL address in the case of a send WEB function block 22, the HTTP request type (called HTTP method) that the WEB function block 21,22 is capable of sending or receiving (usually POST or GET methods, but also PUT, DELETE, TRACE, OPTIONS, . . . methods), the contents of the message or location of an indexed message (for example an HTML page, an XML message or others) that will be included in the answer 52 from the reception WEB function block 21, in the case of configuration data 229 for a send WEB function block 22, means of defining a correspondence between input parameters IN_1, IN_n for the send WEB function block 22 and elements of an HTTP request 51 (headers), elements of an XML frame or a URL encoded frame contained in an HTTP request 51, in the case of configuration data 229 for a send WEB function block 22, means of making a correspondence between the elements of an HTTP answer 52 (headers) or elements of an XML frame contained in an HTTP request 52, and the output parameters OUT_1, OUT_n for the send WEB function block 22, in the case of configuration data 219 for a reception WEB function block 21, means of defining a correspondence between the elements of an HTTP request 51 (headers), elements of an XML frame or a URL encoded frame contained in an HTTP request 51, and secondly the output parameters OUT_1, OUT_n for the reception WEB function block 21, in the case of configuration data 219 for a reception WEB function block 21, means of defining a correspondence between input parameters IN_1, IN_n for the reception WEB function block 21 and the elements of an HTTP answer 52 (headers) or elements of an XML frame contained in an HTTP request 52, the format of frames (called "Content Type") that a WEB function block will be capable of generating or interpreting. This aspect is important because it will thus be able to authorize taking account of future changes to the WEB. Due to this configuration, and starting from stabilized protocols (HTTP and XML), it will be possible to include data libraries (XML diagrams) so that new and changing protocols can be implemented.

The means of creating a correspondence between the input/output parameters of a function block and elements of an XML frame, a URL frame or an HTTP request/answer are implemented by the function block and may involve variable sophistication depending on the required flexibility of use and the complexity of the format to be interpreted.

For a good understanding of this invention, examples of means of making a correspondence are described below. These examples are limited to a simple implementation corresponding to the case of function blocks only capable of accepting a rigid request format and only producing a rigid answer format. However, the state of the art in data processing is such that it would be easy to produce more sophisticated variants starting from this case, both for the conversion formats between the automation equipment data and WEB text data and the format of the WEB document itself.

The means used to create a correspondence and satisfy the four cases mentioned above are based on two mechanisms:

a) Analysis of an input frame (received answer or request) to extract the output parameters OUT_1, OUT_n for the function block. This analysis is based on a description of the frame in order to find the place of the parameters and for each parameter, a description of the conversion between the text format contained in request and the internal format of the automation equipment. This case is also applicable to sending a request by a send WEB function block and to sending an answer by a reception WEB function block, b) Synthesis of a frame to be sent (request or answer to be sent) starting from input parameters IN_1, IN_n for the function block. This synthesis also uses two element types; a typical frame and substitution rules used to insert the value of parameters.

Therefore, the configuration of a given function block comprises two parts specifically allocated to analysis and to synthesis.

Example of a conversion description for a request input into a reception WEB function block formatted using the XML language:

```
<?xml version-"1-0"?>
<!DOCTYPE tag1 SYSTEM "exemple.dtd">
<surveillance>
<type>%OUT_1:STRING</type><br />
    <num_requete>%OUT_2:INT</num_requete>
</surveillance>
```

When the application is started, the program code in the function block analyses this description and records the correspondence between the areas in the expected document (inside the <type> and <num_requete> (request number) tags), themselves included in a <surveillance> tag, and the parameters for the function block.

When the following request is received:

```
<?xml version-"1-0"?>
<!DOCTYPE tag1 SYSTEM "exemple.dtd">
<surveillance>
    <type>alarme</type><br />
    <num_requete>58</num_requete>
</surveillance>
``` the program code in the function block sets the output parameters indicated OUT_1="alarme", OUT_2=58.

Example conversion description for the answer to be sent in a reception WEB function block:

```
<?xml version-"1-0"?>
<!DOCTYPE tag1 SYSTEM "exemple.dtd">
<notification>
    <numero>%IN_1:INT</numero>
    <contenu>
    <validite>%IN_2:BOOL</validite>
    <message>%IN_3:STRING</message>
    </contenu>
    <code_demandeur>%IN_4:INT</code_demandeur>
    <num_requete>%IN_5:INT</num_requete>
</notification>
```

When the application starts, the program code for the function block saves this description and the locations in which it must enter values of input parameters and the address of these input parameters in the memory of the automation equipment.

When the application program activates the answer, it converts the input parameters IN_1 to IN_5 and inserts the result of this conversion into the memorized locations and then sends the answer by calling a function of the generic part of a WEB function block.

Thus, for typical values such as IN_1=2, IN_2=true, IN_3="Alarme temperature", IN_4=1234, IN_5 =58, it is easy to generate the following answer document:

```
<?xml version="1-0"?>
<!DOCTYPE tag1 SYSTEM "exemple.dtd">
<notification>
    <numero>2</numero>
    </contenu>
    <validite>true</validite>
    <message>alarme temperature>/message>
    </contenu>
    <code_demandeur>1234</code_demandeur>
    <num_requete>58<num_requete>
<notification>
```

As mentioned above, this example is simple but it would be possible to use more flexible representations, for example:

check of the data conversion, for example using the formalism of the C language (printf and scanf);

check of the validity and format of a received document, for example using an analyser in the SAX or DOM or XSL-T format;

generation of a document with variable form, using the values of the input parameters IN_x to control an XSL-T transformation.

Normally, an application program is designed using a programming station that in particular offers all functions to read/write an automation application program, load/unload in automation equipment, and monitoring/display its execution in the automation equipment. One of the advantages of this invention is the fact that the WEB function blocks are integrated into the application program 20 immediately because the connection of WEB function blocks to instructions in the application program 20 is made directly with the programming station that writes this application program. Therefore, with a programming station of this type, the designer of an application program is capable of displaying, modifying, inserting or deleting WEB function blocks 21, 22 without any particular knowledge other than that enabling him to design an application program 20, which will very much facilitate opening up of WEB communications to automation applications.

The programming station can directly set parameters for the configuration data 219, 229 of WEB function blocks 21, 22 in text form, thus making them easy accessible to the application program designer. For example, it would be possible for the configuration data 219, 229 to be displayed in plain language and for them to be modified in a special window that opens when the designer points to the graphic representation of a WEB function block in the programming station.

Furthermore, the programming station may use preconfigured WEB function block libraries that can be memorized and manipulated from the programming station and offering sets of WEB function blocks specialized in a type of content and/or a protocol implemented using HTTP. Examples that could be included in this type of library include an HTML server function block, a WML server function block, a SOAP client or server function block, etc. Thus, these libraries facilitate the work to be done by a designer by proposing several preconfigured function blocks to him that he can quickly insert and instantiate in his application program.

When a request 51 is received by automation equipment 10, the HTTP interface 15 of the automation equipment 10 analyses and detects if the destination URL address contained in the request 51 corresponds to the URL address of a reception WEB function block 21 of the automation equipment 10. If it does, the HTTP interface 15 acts as an HTTP server, by doing the routing and signalling the arrival of the request 51 to the reception WEB function block 21. The URL address of the sender of the request 51 is memorized so that the answer 52 that will be generated by the reception WEB function block 21 can be sent.

When a request 51 is sent by a send WEB function block 22 of automation equipment 10, the HTTP interface 15 of this automation equipment acts as an HTTP client and routes the request to the destination URL address contained in the request 51.

Obviously, it would be possible to imagine other variants and improvements to detail without going outside the framework of the invention, and even to envisage the use of equivalent means.

What is claimed is:

1. A communication system for automation equipment for communicating over a TCP/IP network wherein such automation equipment is for controlling an automation application by executing an application program written in one or several languages according to standard IEC 1131-3, the communication system comprising:

exchange means for implementing a WEB server function or a WEB client function inside an application program, said exchange means comprising at least one WEB function block for interacting with such application program, said WEB function block comprising a generic program code and configuration data that are specific to each WEB function block, said configuration data comprising a general format of frames exchanged by the WEB function block, a type of HTTP request that the WEB function block can receive or send and the relative URL address of the WEB function block in the automation equipment, and an HTTP interface in such automation equipment for routing messages from the TCP/IP network to a WEB function block identified by a URL address, and for routing messages from a WEB function block in the automation equipment to a URL address on the TCP/IP network.

2. A communication system according to claim 1, comprising at least one reception WEB function block for implementing a WEB server function in an application program.

3. A communication system according to claim 2, comprising at least one send WEB function block for implementing a WEB client function in an application program.

4. A communication system according to claim 1, wherein the configuration data of WEB function blocks is integrated in an application program, in text form.

5. A communication system according to claim 2, wherein the configuration data of said reception WEB function block comprise means for making a correspondence between the elements of an HTTP request and output parameters (OUT_1, OUT_n) for the reception WEB function block, and means for creating a correspondence between input parameters (IN_1, IN_n) for the reception WEB function block and the elements of an HTTP answer.

6. A communication system according to claim 3, wherein the configuration data of said send WEB function block contain means for creating a correspondence between input parameters (IN_1, IN_n) for the send WEB function block and the elements of an HTTP request, and means for creating a correspondence between elements of an HTTP answer and output parameters (OUT_1, OUT_n) for the send WEB function block.

7. A communication system according to claim 3, wherein the contents of an HTTP request or an HTTP answer is an XML frame.

8. A communication system according to claim 7, wherein configuration data of said reception WEB function block contain means for making a correspondence between the elements of an XML frame contained in an HTTP request and output parameters (OUT_1, OUT_n) for the reception WEB function block, and means for creating a correspondence between the input parameters (IN_1, IN_n) for the reception WEB function block and the elements of an XML frame contained in an HTTP answer.

9. A communication system according to claim 7, wherein configuration data of said send WEB function block contain means for making a correspondence between input parameters (IN_1, IN_n) for the send WEB function block and elements of an XML frame contained in an HTTP request, and means for creating a correspondence between the elements of an XML frame contained in an HTTP answer (52) and the output parameters ($OUT_{13}$ 1, $OUT_{13}$ n) for the send WEB function block.

10. A communication system according to claim 1, wherein the content of an HTTP request is a URL encoded frame.

11. A communication system according to claim 10, wherein configuration data of a reception WEB function block contain means for creating a correspondence between the elements of an encoded URL frame contained in an HTTP request and output parameters ($OUT_{13}$ 1, $OUT_{13}$ n) for the reception WEB function block.

12. A communication system according to claim 10, wherein configuration data of said send WEB function block contain means of creating a correspondence between input parameters (IN-1, IN_n) for the send WEB function block and the elements of a URL encoded frame contained in an HTTP request.

13. A communication system according to claim 1 in combination with automation equipment, wherein said automation equipment comprises an application program for integrating a communication system on a TCP/IP network.

* * * * *